United States Patent
Kressmann et al.

(10) Patent No.: US 8,372,267 B2
(45) Date of Patent: Feb. 12, 2013

(54) PROCESS FOR THE SEQUENTIAL HYDROCONVERSION AND HYDRODESULFURIZATION OF WHOLE CRUDE OIL

(75) Inventors: Stephane Cyrille Kressmann, Dhahran (SA); Raheel Shafi, Dhahran (SA); Ali Hussain Alzaid, Dammam (SA); Esam Z. Hamad, Dhahran (SA)

(73) Assignee: Saudi Arabian Oil Company (SA)

( * ) Notice: Subject to any disclaimer, the term of this patent is extended or adjusted under 35 U.S.C. 154(b) by 801 days.

(21) Appl. No.: 12/501,300

(22) Filed: Jul. 10, 2009

(65) Prior Publication Data

US 2010/0025293 A1 Feb. 4, 2010

Related U.S. Application Data

(60) Provisional application No. 61/080,582, filed on Jul. 14, 2008.

(51) Int. Cl.
*C10G 65/00* (2006.01)

(52) U.S. Cl. ........... 208/97; 208/49; 208/58; 208/208 R; 208/209; 208/211; 208/213; 208/216 R; 208/217; 208/251 R; 208/253; 208/251 H

(58) Field of Classification Search ............. 208/49, 208/58, 97, 208 R, 209, 211, 213, 216 R, 208/217, 251 H, 251 R, 253
See application file for complete search history.

(56) References Cited

U.S. PATENT DOCUMENTS

| | | | |
|---|---|---|---|
| 2,560,433 A | 7/1951 | Gilbert et al. | |
| 2,600,931 A | 6/1952 | Slater | |
| 2,646,388 A | 7/1953 | Crawford et al. | |
| 2,755,225 A | 7/1956 | Porter et al. | |
| 2,771,401 A | 11/1956 | Shepherd | |
| 2,909,476 A | 10/1959 | Hemminger | |
| 2,912,375 A | 11/1959 | MacLaren | |
| 2,939,835 A | 6/1960 | Varga et al. | |
| 3,119,765 A | 1/1964 | Corneil et al. | |
| 3,262,874 A | 7/1966 | Gatsis | |
| 3,501,396 A | 3/1970 | Gatsis et al. | |
| 3,617,524 A | 11/1971 | Conn | |
| 3,623,974 A | 11/1971 | Mounce | |
| 3,684,688 A | 8/1972 | Roselius | |
| 3,686,093 A | 8/1972 | Irvine | |
| 3,694,351 A | 9/1972 | White | |
| 3,706,657 A | 12/1972 | Paraskos et al. | |

(Continued)

FOREIGN PATENT DOCUMENTS

| AU | 8544833 A | 1/1986 |
|---|---|---|
| BE | 894513 | 1/1983 |

(Continued)

OTHER PUBLICATIONS

Seki, H. et al. (1999). Catalyst Deactivation, Elsevier, 357-364.*

(Continued)

*Primary Examiner* — Brian McCaig

(74) *Attorney, Agent, or Firm* — Bracewell & Giuliani LLP

(57) ABSTRACT

The invention relates to a method for removing sulfur from crude oils using a catalytic hydrotreating process operating at moderate temperature and pressure and reduced hydrogen consumption. The process produces sweet crude oil having a sulfur content of between about 0.1 and 1.0 wt % in addition to reduced crude density. The method employs least two reactors in series, wherein the first reactor includes a hydroconversion catalyst and the second reactor includes a desulfurization catalyst.

27 Claims, 4 Drawing Sheets

U.S. PATENT DOCUMENTS

| | | |
|---|---|---|
| 3,730,879 A | 5/1973 | Christman et al. |
| 3,730,880 A | 5/1973 | Van der Toorn et al. |
| 3,787,315 A | 1/1974 | Bearden, Jr. et al. |
| 3,806,444 A | 4/1974 | Crouch et al. |
| 3,809,644 A | 5/1974 | Johnson et al. |
| 3,826,737 A | 7/1974 | Pegels et al. |
| 3,876,530 A | 4/1975 | Frayer et al. |
| 3,876,533 A | 4/1975 | Myers |
| 3,887,455 A | 6/1975 | Hamner et al. |
| 3,901,792 A | 8/1975 | Wolk et al. |
| 3,915,841 A | 10/1975 | Murphy, Jr. et al. |
| 3,926,784 A | 12/1975 | Christman et al. |
| 3,957,622 A | 5/1976 | Gatsis et al. |
| 3,976,559 A | 8/1976 | Bearden, Jr. et al. |
| 4,003,823 A | 1/1977 | Baird, Jr. et al. |
| 4,003,824 A | 1/1977 | Baird, Jr. et al. |
| 4,006,076 A | 2/1977 | Christensen et al. |
| 4,007,109 A | 2/1977 | Baird, Jr. et al. |
| 4,007,111 A | 2/1977 | Baird, Jr. |
| 4,016,069 A * | 4/1977 | Christman et al. ............ 208/210 |
| 4,017,381 A | 4/1977 | Baird, Jr. et al. |
| 4,017,382 A | 4/1977 | Bonnell et al. |
| 4,045,182 A | 8/1977 | Bonnell |
| 4,045,331 A | 8/1977 | Ward |
| 4,048,060 A | 9/1977 | Riley |
| 4,052,295 A | 10/1977 | Pronk |
| 4,076,613 A | 2/1978 | Bearden, Jr. |
| 4,089,774 A | 5/1978 | Oleck et al. |
| 4,118,310 A | 10/1978 | Frayer et al. |
| 4,119,528 A | 10/1978 | Baird, Jr. et al. |
| 4,120,779 A | 10/1978 | Baird, Jr. et al. |
| 4,120,780 A | 10/1978 | Morimoto et al. |
| 4,234,402 A | 11/1980 | Kirkbride |
| 4,259,294 A | 3/1981 | Van Zijll Langhout et al. |
| 4,332,671 A | 6/1982 | Boyer |
| 4,348,270 A | 9/1982 | Bearden, Jr. et al. |
| 4,406,777 A | 9/1983 | Melconian |
| 4,411,768 A | 10/1983 | Unger et al. |
| 4,431,525 A | 2/1984 | Hensley, Jr. et al. |
| 4,431,526 A | 2/1984 | Simpson et al. |
| 4,568,450 A | 2/1986 | Ting et al. |
| 4,588,709 A | 5/1986 | Morales et al. |
| 4,617,110 A | 10/1986 | Hinojos et al. |
| 4,619,759 A | 10/1986 | Myers et al. |
| 4,626,340 A | 12/1986 | Galiasso et al. |
| 4,642,179 A | 2/1987 | Morales et al. |
| 4,652,361 A | 3/1987 | Kukes et al. |
| 4,657,664 A * | 4/1987 | Evans et al. .................. 208/211 |
| 4,657,665 A | 4/1987 | Beaton et al. |
| 4,729,826 A | 3/1988 | Lindsay et al. |
| 4,832,829 A | 5/1989 | de Agudelo et al. |
| 4,894,144 A | 1/1990 | Newman et al. |
| 4,925,554 A | 5/1990 | Sato et al. |
| 4,968,409 A | 11/1990 | Smith |
| 5,009,768 A | 4/1991 | Galiasso et al. |
| 5,045,177 A | 9/1991 | Cooper et al. |
| 5,076,908 A | 12/1991 | Stangeland et al. |
| 5,176,820 A | 1/1993 | Lew |
| 5,178,749 A | 1/1993 | Lopez et al. |
| 5,258,115 A | 11/1993 | Heck et al. |
| 5,264,188 A | 11/1993 | Lew |
| 5,417,846 A | 5/1995 | Renard |
| 5,591,325 A | 1/1997 | Higashi |
| 5,779,992 A | 7/1998 | Higashi |
| 5,916,529 A | 6/1999 | Scheuerman |
| 5,925,238 A | 7/1999 | Duddy et al. |
| 6,132,597 A | 10/2000 | Harle et al. |
| 6,235,190 B1 | 5/2001 | Bertram |
| 6,270,654 B1 | 8/2001 | Colyar et al. |
| 6,280,606 B1 | 8/2001 | Morel et al. |
| 6,306,287 B1 | 10/2001 | Billon et al. |
| 6,309,537 B1 | 10/2001 | Harle et al. |
| 6,447,671 B1 | 9/2002 | Morel et al. |
| 6,554,994 B1 | 4/2003 | Reynolds et al. |
| 6,620,311 B2 | 9/2003 | Morel et al. |
| 2001/0027936 A1 | 10/2001 | Morel et al. |
| 2004/0055934 A1 | 3/2004 | Tromeur et al. |
| 2005/0082202 A1 | 4/2005 | Ackerson et al. |
| 2005/0155909 A1 | 7/2005 | Inomata et al. |
| 2006/0060501 A1 | 3/2006 | Gauthier et al. |
| 2006/0060509 A1 | 3/2006 | Miyauchi et al. |
| 2006/0254956 A1 | 11/2006 | Khan |
| 2007/0187294 A1 | 8/2007 | Ancheyta Juarez et al. |

FOREIGN PATENT DOCUMENTS

| | | |
|---|---|---|
| DE | 2138853 A | 8/1974 |
| DE | 2655260 A1 | 6/1977 |
| EP | 0113283 B1 | 7/1984 |
| EP | 0113297 B1 | 7/1984 |
| EP | 0450997 B1 | 10/1991 |
| EP | 0732389 B1 | 8/2001 |
| EP | 1600491 A1 | 11/2005 |
| EP | 1652905 A | 5/2006 |
| FR | 2415136 A | 8/1979 |
| FR | 2681871 A1 | 4/1993 |
| FR | 2784687 A1 | 4/2000 |
| GB | 438354 | 4/1934 |
| GB | 710342 | 9/1950 |
| GB | 744159 | 7/1953 |
| GB | 0721357 | 1/1955 |
| GB | 830923 | 3/1956 |
| GB | 786451 | 11/1957 |
| GB | 1073728 | 7/1964 |
| GB | 1181982 | 6/1967 |
| GB | 1335348 | 2/1970 |
| GB | 1523992 | 9/1978 |
| GB | 2026533 A | 2/1980 |
| GB | 2066287 A | 7/1981 |
| GB | 2124252 A | 2/1984 |
| GB | 2150852 A | 12/1984 |
| JP | 71034507 B | 7/1968 |
| JP | 49015703 A | 2/1974 |
| JP | 49051303 A | 5/1974 |
| JP | 74037085 B | 10/1974 |
| JP | 48054105 A | 10/1975 |
| JP | 76038722 B | 10/1976 |
| JP | 60065093 A | 4/1985 |
| JP | 2000265177 A | 3/1999 |
| NL | 6916017 A | 4/1970 |
| NL | 7213105 | 9/1972 |
| NL | 7115994 A | 9/1974 |
| NL | 7117302 A | 10/1974 |
| RU | 2074883 C1 | 3/1997 |
| WO | 0198436 A1 | 12/2001 |
| WO | 2004078889 A1 | 9/2004 |
| WO | 2006039429 A | 4/2006 |
| WO | 2006114489 A1 | 11/2006 |
| WO | 2009073436 A2 | 6/2009 |

OTHER PUBLICATIONS

Seki, H. et al. (2001). Fuel Processing Technology, 69, 229-238.*
International Search Report for PCT/US2009/050486 dated May 26, 2010 (4 pages).

* cited by examiner

PROCESS FOR THE SEQUENTIAL HYDROCONVERSION AND HYDRODESULFURIZATION OF WHOLE CRUDE OIL

RELATED APPLICATIONS

This application claims priority to U.S. Provisional Patent Application Ser. No. 61/080,582, filed on Jul. 14, 2008, which is incorporated by reference in its entirety.

FIELD OF THE INVENTION

The present invention relates to a process for the hydrodesulfurization of sour crude oils using a catalytic hydrotreating and desulfurization processes operating at moderate temperature and pressure and at reduced hydrogen consumption.

BACKGROUND OF THE INVENTION

The removal of sulfur compounds from crude oil and its fractions has been of significant importance for several decades, but has become even more important in recent years due to tightening environmental legislation. While much of the prior art focuses on the desulfurization of individual crude oil fractions, a large segment of the art has addressed processes for the hydroprocessing of whole crude oil. The majority of the interest in recent years has focused on the upgrading of very heavy crude oil (i.e., API gravity<20), shale and tar-sands, to produce light sweet synthetic crudes. One major driving force for these processes is the demand for light crude oils in refineries and the low value of highly viscous feedstocks. Furthermore, refinery demands are shifting from high sulfur fuel oils to low- and ultra-low sulfur products, i.e., products containing about 1 wt % (LSFO) and about 0.5 wt % (ULSFO). Therefore, the ability to produce LSFO or ULSFO, instead of high sulfur fuel oils, is highly advantageous and desired.

One major technical challenge posed when hydrotreating heavy oil fractions or whole crude is the effect of small concentrations of contaminants, such as for example, organic nickel and vanadium compounds. These organometallic compounds and others have been proven to reduce the activity or lifetime of hydrotreating catalysts.

Another major challenge faced during the processing of whole crude oil is that the concentration of coke precursors can generally be very high. These coke precursors, such as for example, asphaltenic plates, can reduce the activity or lifetime of hydro-desulfurization (HDS) catalysts. This results in a decreased performance of a conventional process over time, thus requiring more frequent addition or replacement of catalyst to ensure continued operation. Catalyst replacement can be both costly and time consuming, thereby reducing the overall economic feasibility of the process.

Generally, deactivation of catalyst within a hydroprocessing unit typically occurs by one of two primary mechanisms: (1) metal deposition and (2) coke formation. For each mechanism, increasing the operating temperature of the hydroprocessing unit can help maintain catalyst performance; however, all process units have maximum temperature limits based upon the metallurgy of the process unit. These maximum temperatures limit the amount of time a catalyst can operate before requiring catalyst replacement, typically by either the regeneration of spent catalyst or the addition of fresh catalyst. Furthermore, the replacement of spent catalyst with fresh catalyst can require the complete shutdown of a process unit in order to unload the deactivated spent catalyst and load fresh catalyst into the unit. This process unit downtime reduces the on-stream time and negatively impacts the economics of the process.

SUMMARY

Provided is a process for the desulfurization of sour crude oils using a catalytic hydrotreating process. The method includes the steps of (a) contacting a crude oil feedstock with hydrogen gas to produce a hydrogen gas crude oil mixture; (b) contacting the hydrogen gas crude oil mixture with a hydroconversion catalyst in a first reactor maintained at a temperature of between about 400° C. and 450° C. to produce an effluent having an asphaltene content of less than 5% by weight, wherein said hydroconversion catalyst includes a bimodal support material; (c) contacting the effluent from the first reactor with hydrogen gas to produce a effluent hydrogen gas mixture; (d) contacting the effluent hydrogen gas mixture with a desulfurization catalyst in a second reactor to produce an upgraded crude oil product having a reduced sulfur content and an increased API gravity, wherein said second reactor is maintained at a temperature that is less than the temperature that is maintained in the first reactor.

The hydroconversion catalyst can further include a base metal selected from the group consisting of a group VB metal, a group VIB metal and a group VIIIB metal and wherein the bimodal support material includes a first pore size having an average diameter of between about 6000 and 10000 Angstroms and a second pore size having an average diameter of between about 80 and 150 Angstroms. The hydroconversion catalyst can also include a promoter metal, wherein the promoter metal is selected from the group consisting of a group IIB metal, a group IVB metal and a group VIIIB metal, and wherein the promoter metal is present in an amount between about 1 and 3% by weight. The hydroconversion catalyst can include a molybdenum base metal in an amount of between about 7.5 and 9% by weight, and a nickel promoter metal in an amount of between about 1 and 3% by weight.

The hydrodesulfurization catalyst can include a base metal selected from a group VB, VIB or VIIIB metal. The hydrodesulfurization catalyst can also include a support material having an average pore size of between about 100 and 300 Angstroms. The hydrodesulfurization catalyst can also include a promoter metal, wherein said promoter metal is selected from the group consisting of a group IIB metal, a group IVB metal and a group VIIIB metal, and wherein the promoter metal is present in an amount between about 1 and 3% by weight. The hydrodesulfurization catalyst can include a molybdenum base metal in an amount of between about 9 and 11% by weight, and a nickel promoter metal in an amount of between about 2 and 3% by weight.

In another aspect, a method for upgrading crude oil is provided. The method includes the steps of (a) contacting a crude oil feedstock with hydrogen gas to produce a hydrogen gas crude oil mixture; (b) contacting the hydrogen gas crude oil mixture with a hydroconversion catalyst in a first reactor, wherein the hydroconversion catalyst includes a support material having a bimodal pore size wherein the first pore size is between about 6000 and 10000 Angstroms and the second pore size is between about 80 and 150 Angstroms, and wherein the first reactor is maintained at a temperature of between about 400° C. and 450° C. to produce an effluent having an reduced asphaltene concentration relative to the crude oil feedstock; (c) contacting the effluent from the first reactor with hydrogen gas to produce an effluent hydrogen gas mixture; and (d) contacting the effluent hydrogen gas mixture with a desulfurization catalyst in a second reactor to produce an upgraded crude oil product having a reduced sulfur content and an increased API gravity, wherein the second reactor is maintained at a temperature that is less than the temperature that is maintained in the first reactor.

The hydroconversion catalyst can include a base metal selected from a group VIIIB metal and a bimodal support material, wherein the bimodal support material includes a first pore size having an average diameter greater than at least about 2000 Angstroms and less than about 15000 Angstroms and a second pore size having an average diameter of between about 50 and 250 Angstroms. The hydrodesulfurization catalyst can include a base metal selected from the group consisting of a group VB metal, a group VIB metal and a group VIIIB metal and a catalyst support material having an average pore size of between about 100 and 300 Angstroms.

DETAILED DESCRIPTION OF THE INVENTION

Although the following detailed description contains many specific details for purposes of illustration, one of ordinary skill in the art will appreciate that many variations and alterations to the following details are within the spirit and scope of the invention. Accordingly, the exemplary embodiments of the invention described herein are set forth without any loss of generality to, and without imposing limitations thereon, the claimed invention.

Described is a process is provided for the upgrading of whole crude oil, which can include the use of a series of at least two reactors, for example, ebullating bed reactors. The reactors employ different catalysts, and thus target different kinetic regimes, such as for example, the hydroconversion and hydrodesulfurization of whole crude oil feedstock.

The first reactor can include a hydroconversion catalyst that is selective for the conversion of high boiling hydrocarbons, particularly for the hydroconversion of hydrocarbon fractions having a boiling point greater than about 540° C. Typically, the catalyst employed in the first reactor is selective for the conversion of hydrocarbon fractions having a boiling point greater than about 540° C., and converts heavy material predominantly via thermal cracking. In certain embodiments, the hydroconversion catalyst employed in the first reactor can be operated such that the asphaltene content of the effluent from the first reactor is reduced to less than 10% by weight of the effluent, preferably less than 8% by weight, and even more preferably less than about 5% by weight. In certain embodiments, the asphaltene content of the effluent from the first reactor is reduced to less than 4% by weight of the effluent, preferably less than 3% by weight. Use of hydroconversion catalysts in the first reactor, as noted above, is also advantageous because the catalyst used also acts as a pretreatment for the second stage.

Generally, the second reactor includes a catalyst that is selective for hydrodesulfurization of the whole crude feed. The reactor conditions and the catalyst selected are operable to specifically remove sulfur from the liquid product, thereby producing an upgraded whole crude oil, or synthetic crude oil, having both a reduced sulfur content and an increased API gravity, as compared with the feedstock.

Figure 1:
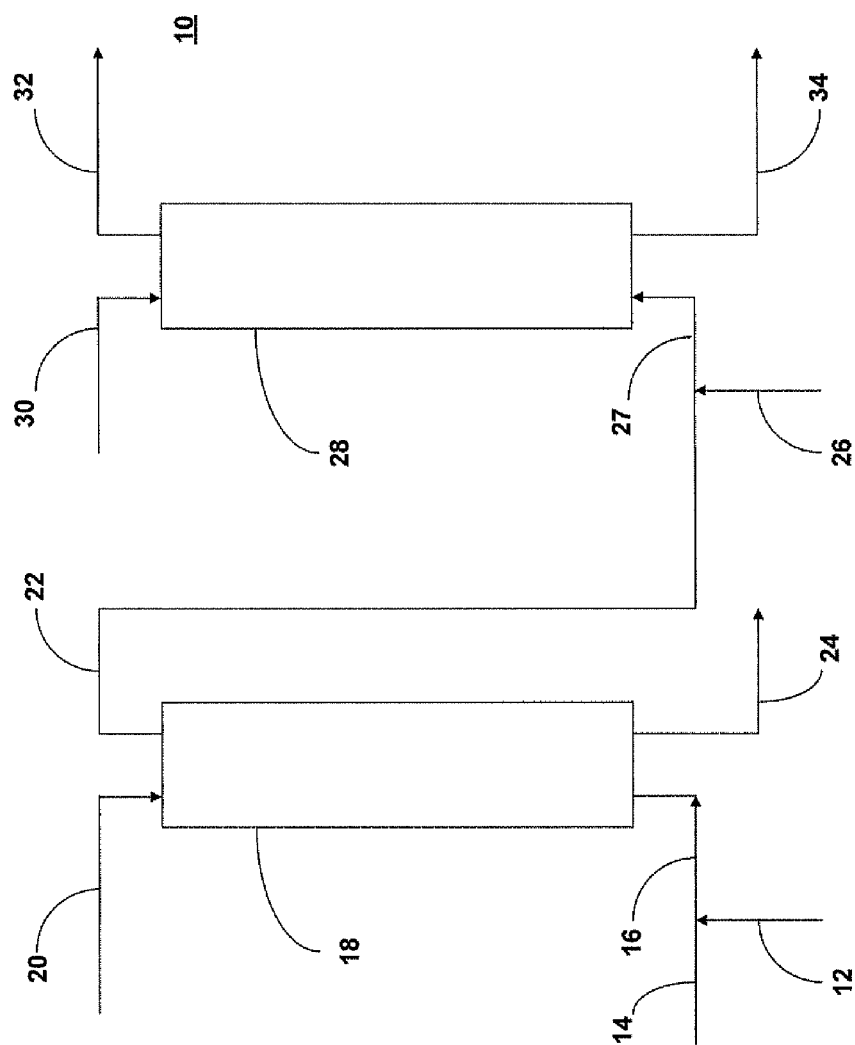
FIG. 1 is a diagram of one embodiment of a system for upgrading a whole crude oil.

FIG. 1 shows an exemplary method of operation where a whole crude oil feedstock is upgraded. Whole crude oil feed 14 is contacted with hydrogen gas 12 at a pressure of between about 50 and 150 bar to create a crude oil/hydrogen gas mixture 16. In certain embodiments, the hydrogen gas pressure is less than about 120 bar. Alternatively, the hydrogen gas pressure is maintained between about 75 and about 125 bar, or between about 85 and 110 bar. In yet other embodiments, the hydrogen gas pressure is maintained at about 100 bar. Crude oil/hydrogen gas mixture 16 is supplied to first reactor 18, preferably being supplied upwardly to a first ebullating bed reactor that includes a hydroconversion catalyst, although it is understood that other reactor designs can also be employed. In certain embodiments, the hydroconversion catalyst employed in first reactor 18 is selective for the conversion of hydrocarbons having a boiling point greater than 540° C.

Fresh and/or regenerated hydroconversion catalyst can be added to first reactor 18 via line 20. Spent catalyst can be withdrawn from the bottom of first reactor 18 via line 24, or by other known means. In certain embodiments, spent catalyst withdrawn via line 24 can optionally be regenerated offline. Optionally, the catalyst regenerated offline can be resupplied back to first reactor 18. In other embodiments, fresh catalyst and regenerated catalyst can be supplied to the first reactor 18 via make-up line 24 to replace spent and/or withdrawn catalyst.

First reactor 18 can be operated at a temperature of between about 350° C. and 450° C., and in certain embodiments can achieve conversion of up to about 50% of the hydrocarbon material having a boiling point above about 540° C. in the crude oil feedstock. In other embodiments, the temperature can be maintained between about 375° C. and 425° C. In yet other embodiments, the temperature can be maintained at about 400° C. Alternatively, the temperature can be maintained between about 400° C. and 425° C. In certain embodiments, the first reactor is operated at a temperature greater than about 400° C. In certain embodiments, the effluent from the first reactor 18 has an asphaltene content of less than about 5 wt %.

Effluent 22 from first reactor 18 is contacted with hydrogen gas 26, and the resulting effluent-hydrogen gas mixture is fed to second reactor 28, preferably being fed upwardly to an ebullating bed reactor that includes a hydrodesulfurization catalyst, although it is understood that alternate reactor designs can also be employed. Fresh and/or regenerated hydrodesulfurization catalyst can be added to second reactor 28 via line 30, and spent catalyst can be withdrawn from the second reactor via line 34. Spent catalyst withdrawn from second reactor 28 can optionally be regenerated offline and resupplied to the second reactor. In one embodiment, second reactor 28 can be operated at a temperature of between about 350° C. and 450° C. In other embodiments, second reactor 28 is operated at a temperature below about 400° C., and in certain other embodiments, the second reactor is operated at a temperatures below about 390° C. Optionally, second reactor 28 is operated at a temperature between about 375° and 400° C. Second reactor 28 can be operated at a pressure of between about 50 and 150 bar. In certain embodiments, second reactor 28 is operated at a pressure of between about 80 and 120 bar. In yet other embodiments, second reactor 28 is operated at a pressure of about 100 bar. The final liquid product from second reactor 28 can be collected via line 32 as an upgraded crude oil product having a sulfur content of about 0.1 to 1 wt % and an API that has been increased by at least about 2 degrees, relative to the crude oil feedstock. It is understood that the first and second reactors can be any known vessels suitable for hydroconversion or hydrodesulfurization of a crude oil feedstock. In certain embodiments, at least one of the reactors is an ebullating bed reactor.

In certain embodiments, the temperature of the first reactor is higher than the temperature of the second reactor. For example, the first reactor can be maintained at a temperature of between about 4000 and 425° C. and a pressure of between about 80 and 120 bar, and the second reactor can be maintained at a temperature of less than about 400° C., and a pressure of about between about 80 and 120 bar. In another embodiment, wherein the pressure of the first and second reactors is maintained at between about 80 and 120 bar, the temperature of the first reactor is maintained at between about 405° and 420° C. and the temperature of the second reactor is maintained between about 380° and 400° C. In yet another embodiment, wherein the pressure of the first and second reactors is maintained at about 100 bar, the temperature of the first reactor is maintained at between about 410° and 420° C. and the temperature of the second reactor is maintained at between about 380° and 390° C. In certain embodiments, maintaining the temperature of the second reactor at less than about 400° C. may improve the equilibrium of the reaction.

In certain embodiments, first reactor 18 and second reactor 28 can be operated at substantially similar reaction conditions with respect to operating temperatures and pressures. Alternatively, first reactor 18 and second reactor 28 can be operated at substantially different reaction conditions with respect to operating temperatures and pressures.

Figure 2:
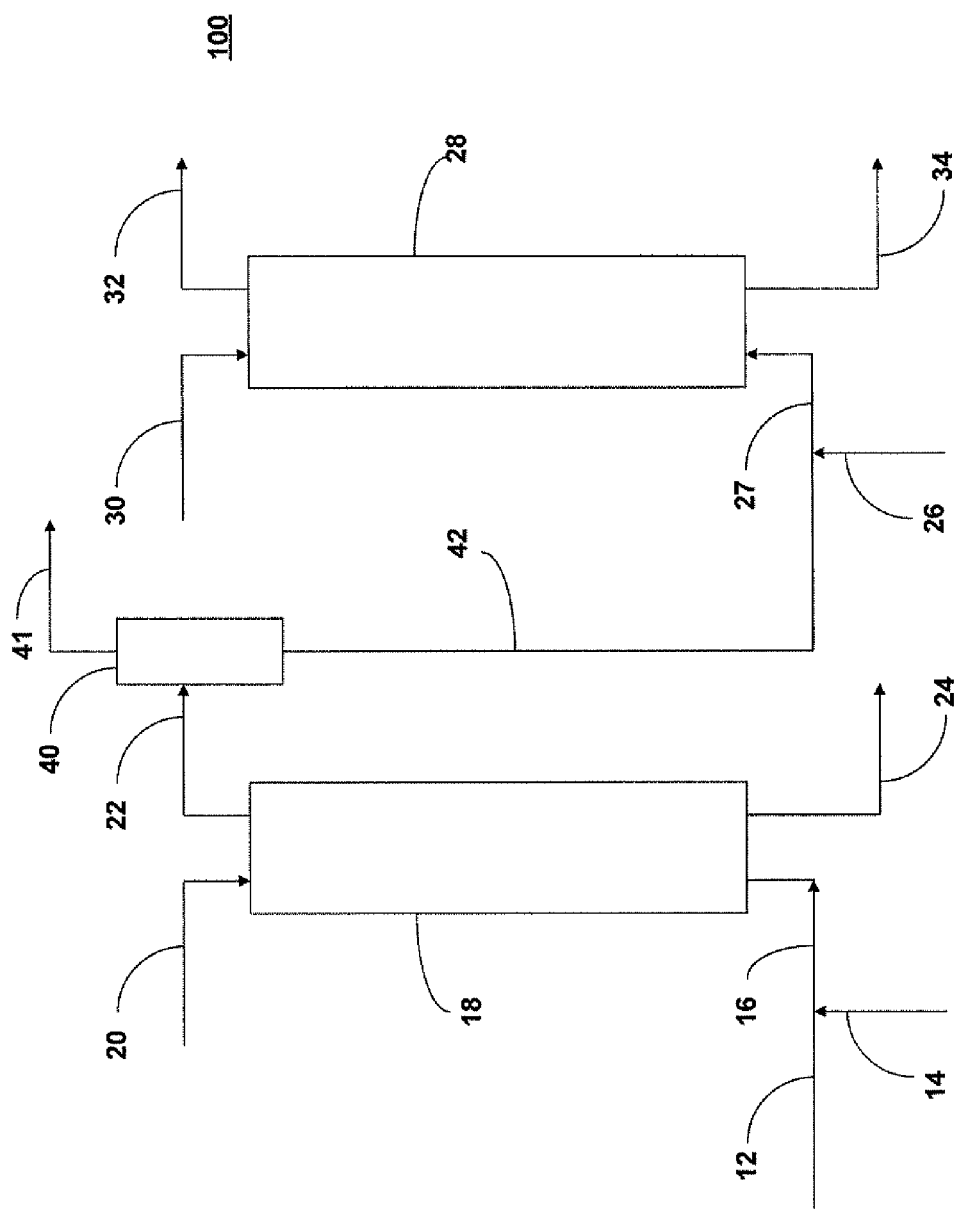
FIG. 2 is a diagram of another embodiment of a system for upgrading a whole crude oil.

Referring to FIG. 2, whole crude fraction 12 is combined with hydrogen gas 14 and supplied via line 16 to first reactor 18. The first reactor 18 can be an ebullating bed reactor charged with a hydroconversion catalyst, as previously described with respect to FIG. 1. Catalyst is added to first reactor 18 via line 20 and removed from the reactor via line 24. The effluent 22 from first reactor 18 can be supplied to inter-stage separator 40, which is operable to remove light gases, such as for example, $H_2S$, $NH_3$ and hydrocarbons having fewer than five total carbon atoms, via line 41. Heavier compounds that are not removed by the inter-stage separator 40 can be mixed with hydrogen gas 26 and supplied via line 27 to second reactor 28. As described with respect to FIG. 1, second reactor 28 can include a desulfurization catalyst. Fresh or regenerated catalyst can be added to second reactor 28 via line 30, and spent catalyst can be withdrawn via line 34. The resulting desulfurized crude can be collected from second reactor 28 via line 32. Reaction conditions for the first and second reactors shown in FIG. 2 can be the same conditions as described with respect to FIG. 1.

In certain embodiments, the effluent hydrogen gas mixture 42 from first reactor 18 can be quenched by a liquid stream. In certain embodiments, the replacement rate of the hydrodesulfurization catalyst and the hydroconversion catalyst may be different. In certain other embodiments, the replacement rate of the hydrodesulfurization and hydroconversion catalysts can be the same.

In certain embodiments, the catalyst can include at least two metals, wherein a first metal is a base metal and a second metal is a promoter metal. The base metal for the hydroconversion catalyst can be selected from a group VB, VIB or VIIIB metal, preferably selected from chromium, molybdenum, tungsten, iron, cobalt and nickel, and combinations thereof, more preferably selected from molybdenum and tungsten. In certain embodiments, the base metal can be present in an amount between about 5 and 15% by weight, preferably between about 7 and 12% by weight, more preferably between about 7.5 and 9% by weight.

In certain embodiments, the hydroconversion catalyst can include a metal sulfide, wherein the metal is selected from the group VB, VIB or VIIIB metals of the periodic table.

The promoter metal for the hydroconversion catalyst can be selected from a group IIB metal, a group IVA metal, or a group VIIIB metal. Exemplary group IIB metals include zinc, cadmium and mercury. Exemplary group IVA metals include germanium, tin and lead. Exemplary group VIIIB metals include iron, ruthenium, cobalt, nickel, palladium and platinum. Preferably, the promoter metal is selected from the group consisting of iron, cobalt, and nickel. In certain embodiments, the promoter metal is nickel and is present in an amount between about 0.5 and 5% by weight, more preferably between about 1 and 3% by weight, even more preferably between about 1.5 and 2.5% by weight.

In one preferred embodiment, the base metal is selected from molybdenum, tungsten and combinations thereof, and is present in an amount between about 7.5 and 9% by weight, and the promoter metal is nickel, and is present in an amount of between about 1 and 3% by weight.

The support material for the hydroconversion catalyst is typically more acidic than the support for the hydrodesulfurization catalyst. Generally, the support material for the catalysts for both the hydroconversion and hydrodesulfurization can be prepared by either precipitation or mulling. Precipitation and mulling are known processes for the formation of support materials. Exemplary support materials for the hydroconversion and hydrodesulfurization catalysts can include zeolites, amorphous silica-alumina and alumina, which can be mulled or kneaded to form a paste, which can be subsequently formed and dried for the formation of the support material. The mulled or kneaded products can further undergo thermal treatment, resulting in more intimate contact between the components. In the present invention, the support material hydroconversion catalyst typically has a greater concentration of co-mulled amorphous silica-alumina and zeolite, and is typically more acidic, as compared with the support material for the hydrodesulfurization catalyst.

The catalyst support material can also include additional components, including binders (e.g., silica or alumina sol suspension), die lubricants (e.g., graphite or stearic acid), and pore forming additives (e.g., wood flower, starch, organic polymers, or carbon fibers).

Pore size distribution of the support material can be affected by the drying, forming and calcining of the precipitate or formed mulled paste. The final shape and size of the pores of the support material is typically determined during the forming step and can include, for example, extrudates, spheres (beads) or pellets. Size and shape are typically determined and selected based upon the need for high activity, acceptable mechanical strength, and the type of reactor being employed.

The support material for the hydroconversion catalyst preferably has a bimodal structure having a first pore size of greater than about 2000 Angstroms, and less than about 15,000 Angstroms, preferably between about 6000 and 10,000 Angstroms and a second pore size of between 50 and 250 Angstroms, preferably about 80 and 150 Angstroms. The first mesoporous pores allow larger asphaltene molecules to enter into the pore and be converted by cracking. The smaller microporous pores are suitable for the conversion of smaller molecules (i.e., molecules smaller than asphaltenes), and in certain embodiments, may also result in some hydrotreatment of the hydrocarbon molecules.

In yet other embodiments, the hydroconversion catalyst can include more than one metal or metal sulfide. Optionally, the hydroconversion catalyst metal is present in an amount of between about 0 and 25% by weight. In other embodiments, the hydroconversion catalyst metal is present in an amount between about 1 and 20% by weight. The hydroconversion catalyst can be supported on any known support material, including but not limited to, γ-alumina and/or γ-alumina and silica in the form of extrudates, spheres, cylinders or pellets, or the like.

In certain embodiments, only one catalyst selected from the hydrodesulfurization catalyst and the hydroconversion catalyst includes a group VIIIB metal. In other embodiments, the hydrodesulfurization and hydroconversion catalysts have a nearly identical metal content. In yet other embodiments, the amount of base metal in the hydroconversion catalyst is greater than the amount of base metal in the hydrodesulfurization catalyst.

In certain embodiments, the hydrodesulfurization catalyst used in second reactor 28 can be selected to preferably remove sulfur through hydrodesufurization reactions, while at the same time, minimizing thermal cracking.

The hydrodesulfurization catalyst can include a base metal selected from a group VB, VIB or VIIIB metal, preferably selected from chromium, molybdenum, tungsten, iron, cobalt and nickel, and most preferably molybdenum. Optionally, the hydrodesulfurization catalyst can include more than one metal. In certain embodiments, the catalyst can include at least two metals, wherein a first metal is a base metal and a second metal is a promoter metal. In certain embodiments, the base metal present in the hydrodesulfurization catalyst can be present in an amount of between about 0 and 25% by weight. In other embodiments, the metal can be present in an amount between about 1 and 20% by weight. In certain embodiments, the base metal is present in an amount between about 5 and 15% by weight, preferably between about 8 and 12% by weight, and even more preferably in an amount of between about 9 and 11% by weight. The desulfurization catalyst can include a metal sulfide selected from the group VB, VIB and VIIIB metals of the periodic table, which can be supported on any known support material, such as for example, but not limited to, γ-alumina and/or γ-alumina and silica in the form of extrudates, spheres, cylinders or pellets.

In certain embodiments, the hydrodesulfurization catalyst can include a promoter metal. The promoter metal can be selected from a group IIB metal, a group IVA metal, or a group VIIIB metal. Exemplary group IIB metals include zinc, cadmium and mercury. Exemplary group IVA metals include germanium, tin and lead. Exemplary group VIIIB metals include iron, ruthenium, cobalt, nickel, palladium and platinum. Preferably, the promoter metal is selected from the group consisting of iron, cobalt, and nickel. In certain embodiments the promoter metal can be present in an amount between about 0.5 and 5% by weight, more preferably between about 1 and 3% by weight, even more preferably between about 2.5 and 3% by weight.

The support for the hydrodesulfurization catalyst has a pore size having a distribution range of between about 75 and 500 Angstroms, preferably between about 100 and 300 Angstroms. Preferably, the catalyst support has a monomodal pore size, resulting in a relatively uniform pore size distribution. The pore size of the desulfurization catalyst allows for sulfur containing molecules to enter the pores and be desulfurized, enabling for a maximization of the surface area available for desulfurization, thereby allowing for a maximum number of active sites to contact the sulfur containing molecules.

Generally, relative to the hydroconversion catalyst, the desulfurization catalyst support material has a lower acidity, having co-mulled amorphous silica-alumina and zeolite being present in larger amounts than is found in the support material for the hydroconversion catalyst.

In an alternate embodiment, the whole crude oil feedstock can be first supplied to a reactor that includes a hydrodesufurization catalyst according to the present invention, and then supplied to a reactor that includes an appropriate hydroconversion catalyst according to the present invention.

In another embodiment, prior to supplying the crude oil to the hydroconversion reactor, the whole crude oil can be separated into two initial fractions, a first whole crude oil fraction having a maximum boiling point of not greater than about 250° C., and a second whole crude oil fraction containing the balance of the whole crude oil (i.e., material having a boiling point greater than about 250° C.). The first whole crude oil fraction can be removed from the whole crude oil processes such that the first whole crude oil fraction is supplied to a separate reaction zone for the removal of sulfur, and can then be recombined with the second reactor effluent 32 to form a final total liquid product having a total reduced sulfur content of preferably between about 0.1 and 1 wt %.

In yet another embodiment, the first whole crude oil fraction can optionally be recombined with the effluent from the first reactor 22, contacted with hydrogen gas 26, and their supplied to the second reactor 28 as a mixture consisting of whole crude oil having a boiling point of less than about 250° C. and hydrogen gas.

EXAMPLE

An Arab heavy crude feedstock having properties as shown in Table I below was processed in accordance with an embodiment of the present invention.

TABLE 1

Properties of Heavy Oil Feedstock

| Crude Origin | Units | Arabian Heavy Export |
|---|---|---|
| Refractive index | | 1.5041 |
| Density at 15° C. | g/ml | 0.8904 |
| API Gravity | ° | 27 |
| CCR | wt % | 8.2 |
| Vanadium | wt ppm | 56.4 |
| Nickel | wt ppm | 16.4 |
| Sulfur | wt % | 2.8297 |
| NaCl content | wt ppm | <5 |
| C | wt % | 84.9 |
| H | wt % | 11.89 |
| O | wt % | 0.43 |
| N | wt % | 0.22 |
| S | wt % | 2.71 |

Figure 3:
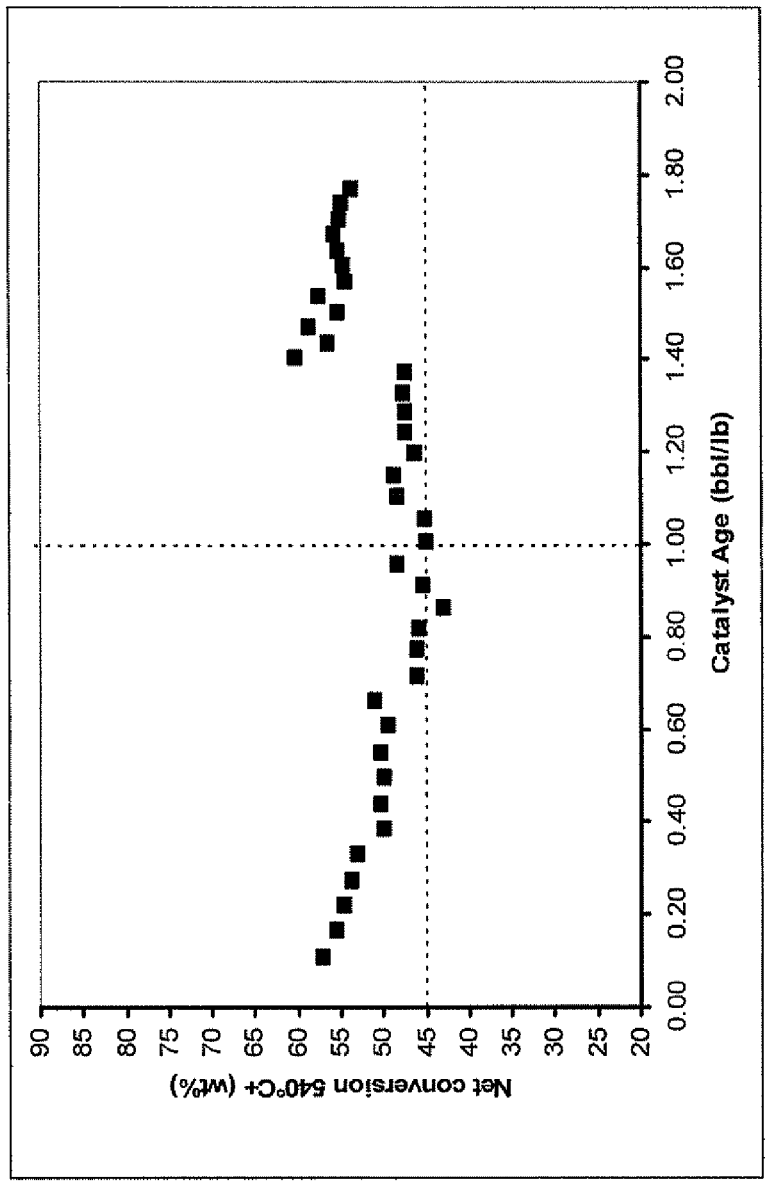
FIG. 3 shows the net conversion of the fraction of hydrocarbons having a boiling point greater than 540° C. according to one embodiment of the process.
Figure 4:
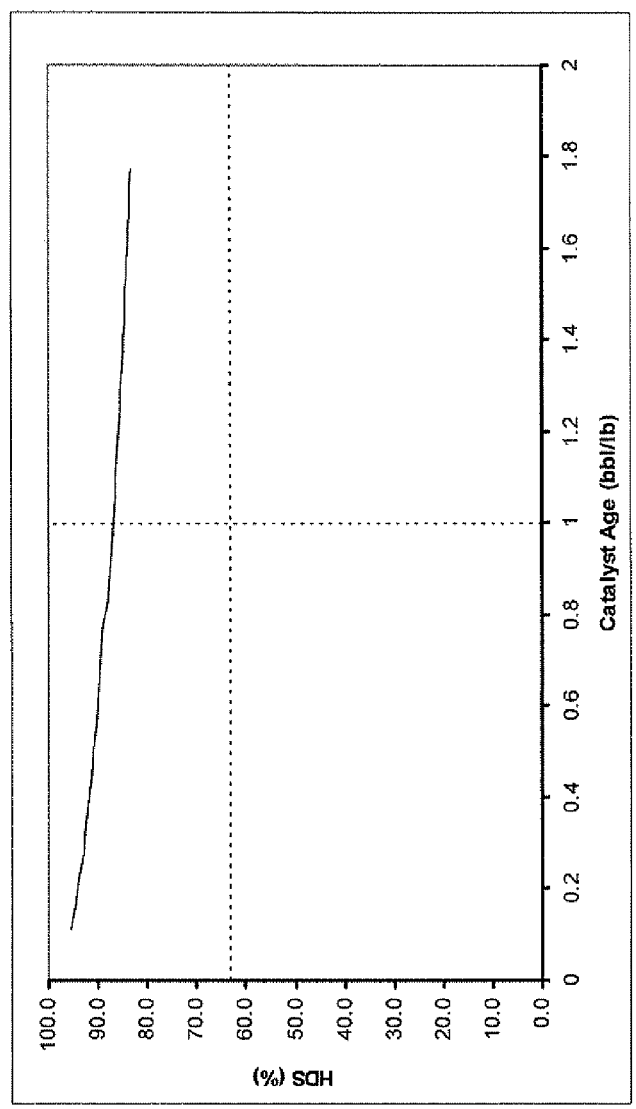
FIG. 4 shows expected hydrodesulfurization according on one embodiment of the process.

The system was maintained at a total hydrogen pressure of about 100 bar and the hydrogen gas to hydrocarbon feedstock ratio was maintained at a ration of about 800 liters of hydrogen per liter of Arab heavy crude feedstock. The catalyst system was maintained at a temperature of between about 400° C. and 420° C. The heavy crude oil was supplied with hydrogen gas to a first reactor charged with a hydroconversion catalyst, and the effluent from the first reactor was then supplied, along with hydrogen gas, to a second reactor charged with a hydrodesulfurization catalyst. The liquid hourly space velocity (LHSV) for the first and second reactors were approximately 0.5 hr$^{-1}$. Net conversion of the fraction having a boiling point greater than 540° C. is shown in FIG. 3, wherein a net conversion of the crude having a boiling point of greater than 540° C. of approximately 45 wt % is achieved. The predicted performance of the hydrodesulfurization reaction in the second reactor is provided in FIG. 4, which predicts that approximately 86 wt % hydrodesulfurization is achieved.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

That which is claimed is:

1. A method for upgrading crude oil, the method comprising:
   (a) contacting a crude oil feedstock with hydrogen gas to produce a hydrogen gas crude oil mixture;
   (b) contacting the hydrogen gas crude oil mixture with a hydroconversion catalyst in a first reactor maintained at a temperature of between about 400° C. and 450° C. to produce an effluent having an asphaltene content of less than 5% by weight, wherein said hydroconversion catalyst comprises a bimodal support material;
   (c) supplying the effluent from the first reactor to an interstage separator to remove a light fraction comprising hydrocarbons having fewer than 5 carbons, hydrogen sulfide and ammonia;
   (d) contacting the effluent from the first reactor with hydrogen gas to produce a effluent hydrogen gas mixture; and
   (e) contacting the effluent hydrogen gas mixture with a desulfurization catalyst in a second reactor to produce an upgraded crude oil product having a reduced sulfur content and an increased API gravity, wherein said second reactor is maintained at a temperature that is less than the temperature that is maintained in the first reactor.

2. The method of claim 1 wherein the hydroconversion catalyst further comprises a base metal selected from the group consisting of a group VB metal, a group VIB metal and a group VIIIB metal and wherein said bimodal support material comprises a first pore size having an average diameter of between about 6000 and 10000 Angstroms and a second pore size having an average diameter of between about 80 and 150 Angstroms.

3. The method of claim 2 wherein the hydroconversion catalyst further comprises a promoter metal, wherein said promoter metal is selected from the group consisting of a group IIB metal, a group IVB metal and a group VIIIB metal, and wherein said promoter metal is present in an amount between about 1 and 3% by weight.

4. The method of claim 2 wherein the base metal of the hydroconversion catalyst comprises molybdenum in an amount of between about 7.5 and 9% by weight, and wherein the hydroconversion catalyst further comprising a nickel promoter metal in an amount of between about 1 and 3% by weight.

5. The method of claim 1 wherein the hydrodesulfurization catalyst comprises a base metal selected from a group VB, VIB or VIIIB metal.

6. The method of claim 5 wherein the hydrodesulfurization catalyst further comprises a promoter metal, wherein said promoter metal is selected from the group consisting of a group IIB metal, a group IVB metal and a group VIIIB metal, and wherein said promoter metal is present in an amount between about 1 and 3% by weight.

7. The method of claim 1 wherein the hydrodesulfurization catalyst comprises a support material having an average pore size of between about 100 and 300 Angstroms.

8. The method of claim 1 wherein the support material for the hydroconversion catalyst is more acidic than the support material for the hydrodesulfurization catalyst.

9. The method of claim 1 wherein the API of the upgraded crude oil product has been increased by about 2 degrees relative to the API of the crude oil feedstock.

10. The method of claim 1 wherein the sulfur content of the upgraded crude oil product is reduced to between about 0.1 and 1.0 wt %.

11. The method of claim 1 wherein at least one of the first and second reactors is an ebullating bed reactor.

12. The method of claim 1 further comprising:
   separating the crude oil feedstock into a first fraction and a second fraction before the crude oil feedstock being supplied to the first reactor, wherein the first fraction has a maximum boiling point less than 250° C. and the second fraction has a boiling point greater than 250° C.;
   removing the first fraction and processing the first fraction in a separate reaction zone to remove sulfur; and
   recombining the desulfurized first fraction with the effluent from the second reactor.

13. The method of claim 1 wherein the desulfurization catalyst comprises a sulfide of a metal selected from groups VB, VIB and VIIIB of the periodic table.

14. The method of claim 1 wherein at least one of the hydroconversion and desulfurization catalyst is regenerated offline.

15. A method for upgrading crude oil, the method comprising:
   (a) separating the crude oil feedstock into a first fraction and a second fraction before the crude oil feedstock being supplied to the first reactor, wherein the first fraction has a maximum boiling point less than 250° C. and the second fraction has a boiling point greater than 250° C.;
   (b) removing the first fraction and processing the first fraction in a separate reaction zone to remove sulfur;
   (c) contacting the second fraction with hydrogen gas to produce a hydrogen gas second fraction mixture;
   (d) contacting the hydrogen gas second fraction mixture with a hydroconversion catalyst in a first reactor maintained at a temperature of between about 400° C. and 450° C. to produce an effluent having an asphaltene content of less than 5% by weight, wherein said hydroconversion catalyst comprises a bimodal support material;
   (e) contacting the effluent from the first reactor with hydrogen gas to produce a effluent hydrogen gas mixture;
   (f) contacting the effluent hydrogen gas mixture with a desulfurization catalyst in a second reactor to produce an upgraded crude oil product having a reduced sulfur content and an increased API gravity, wherein said second reactor is maintained at a temperature that is less than the temperature that is maintained in the first reactor; and
   (g) recombining the desulfurized first fraction with the effluent from the second reactor.

16. The method of claim 15 wherein the hydroconversion catalyst further comprises a base metal selected from the group consisting of a group VB metal, a group VIB metal and a group VIIIB metal and wherein said bimodal support material comprises a first pore size having an average diameter of between about 6000 and 10000 Angstroms and a second pore size having an average diameter of between about 80 and 150 Angstroms.

17. The method of claim 16 wherein the hydroconversion catalyst further comprises a promoter metal, wherein said promoter metal is selected from the group consisting of a group IIB metal, a group IVB metal and a group VIIIB metal, and wherein said promoter metal is present in an amount between about 1 and 3% by weight.

18. The method of claim 16 wherein the base metal of the hydroconversion catalyst comprises molybdenum in an amount of between about 7.5 and 9% by weight, and wherein the hydroconversion catalyst further comprising a nickel promoter metal in an amount of between about 1 and 3% by weight.

19. The method of claim 15 wherein the hydrodesulfurization catalyst comprises a base metal selected from a group VB, VIB or VIIIB metal.

20. The method of claim 19 wherein the hydrodesulfurization catalyst further comprises a promoter metal, wherein said promoter metal is selected from the group consisting of a group IIB metal, a group IVB metal and a group VIIIB metal, and wherein said promoter metal is present in an amount between about 1 and 3% by weight.

21. The method of claim 15 wherein the hydrodesulfurization catalyst comprises a support material having an average pore size of between about 100 and 300 Angstroms.

22. The method of claim 15 wherein the support material for the hydroconversion catalyst is more acidic than the support material for the hydrodesulfurization catalyst.

23. The method of claim 15 wherein the API of the upgraded crude oil product has been increased by about 2 degrees relative to the API of the crude oil feedstock.

24. The method of claim 15 wherein the sulfur content of the upgraded crude oil product is reduced to between about 0.1 and 1.0 wt %.

25. The method of claim 15 wherein at least one of the first and second reactors is an ebullating bed reactor.

26. The method of claim 15 wherein the desulfurization catalyst comprises a sulfide of a metal selected from groups VB, VIB and VIIIB of the periodic table.

27. The method of claim 15 wherein at least one of the hydroconversion and desulfurization catalyst is regenerated offline.

* * * * *